(12) United States Patent
Riu

(10) Patent No.: US 8,182,382 B2
(45) Date of Patent: May 22, 2012

(54) PULLEY ASSEMBLY FOR A START-STOP BELT DRIVE

(75) Inventor: Hervé Riu, La Murette (FR)

(73) Assignee: Dayco Europe S.r.l., Chieti (IT)

( * ) Notice: Subject to any disclaimer, the term of this patent is extended or adjusted under 35 U.S.C. 154(b) by 511 days.

(21) Appl. No.: 12/293,605

(22) PCT Filed: Mar. 21, 2006

(86) PCT No.: PCT/IT2006/000173
§ 371 (c)(1),
(2), (4) Date: Apr. 10, 2009

(87) PCT Pub. No.: WO2007/108020
PCT Pub. Date: Sep. 27, 2007

(65) Prior Publication Data
US 2010/0234156 A1     Sep. 16, 2010

(51) Int. Cl.
*F16D 27/105* (2006.01)
(52) U.S. Cl. ........................ 474/166; 192/90; 192/84.81
(58) Field of Classification Search .................. 474/166, 474/171, 177, 178; 192/90, 84.81, 81 C
See application file for complete search history.

(56) References Cited

U.S. PATENT DOCUMENTS

| 4,273,226 A | 6/1981 | Takefuta et al. |
| 2002/0045508 A1 | 4/2002 | Man et al. |

FOREIGN PATENT DOCUMENTS

| GB | 2034830 A | * | 6/1980 |
| JP | 57-101129 | | 6/1982 |
| JP | 58-8833 | | 1/1983 |
| JP | 58008833 A | * | 1/1983 |
| WO | WO 03/104673 | | 12/2003 |
| WO | WO 2004/070255 | | 8/2004 |

* cited by examiner

*Primary Examiner* — William E Dondero
(74) *Attorney, Agent, or Firm* — Frommer Lawrence & Haug LLP; Ronald R Santucci

(57) ABSTRACT

Described herein is a pulley assembly for a start-stop belt drive, comprising a hub having an axis and designed to be connected to a crankshaft of an internal-combustion engine, a pulley, which is designed to co-operate with a belt of a belt drive and is connected in a rotatable way on the hub, and a seismic mass, which is connected to the hub so as to rotate with respect to the hub so as to define a damping device for damping torsional vibrations. The pulley assembly comprises a band clutch co-operating selectively between the hub and the pulley and comprising a coil element and electromagnetic actuation means for governing clutching and de-clutching of the coil element.

20 Claims, 6 Drawing Sheets

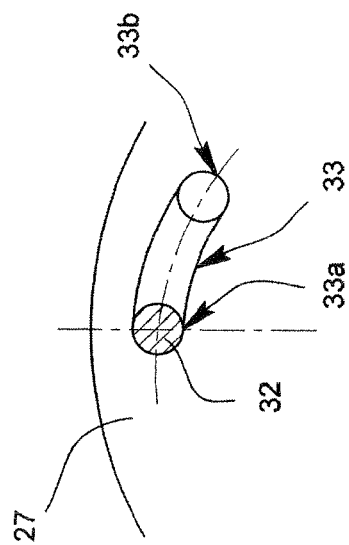
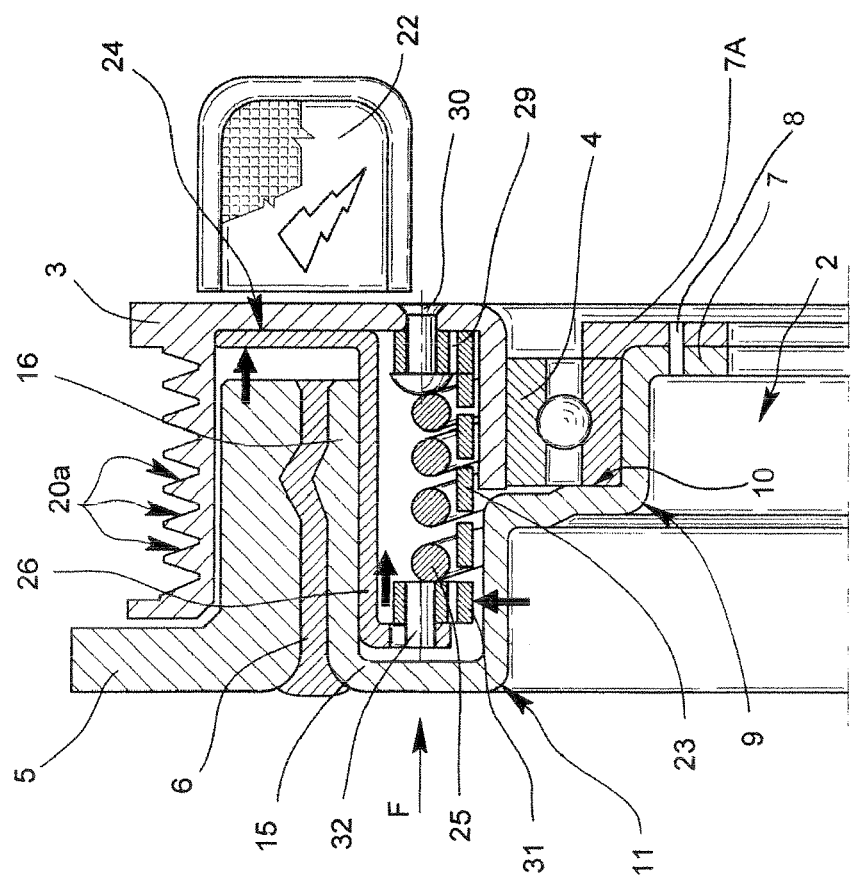

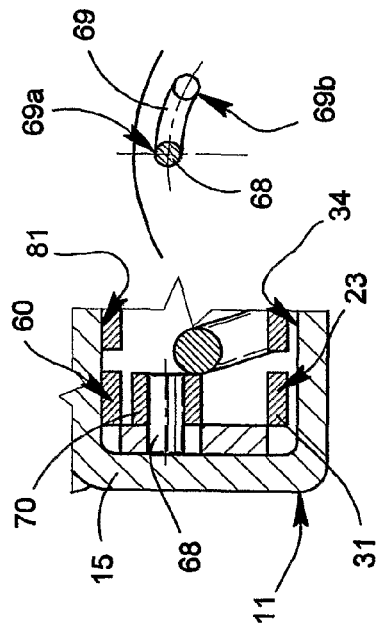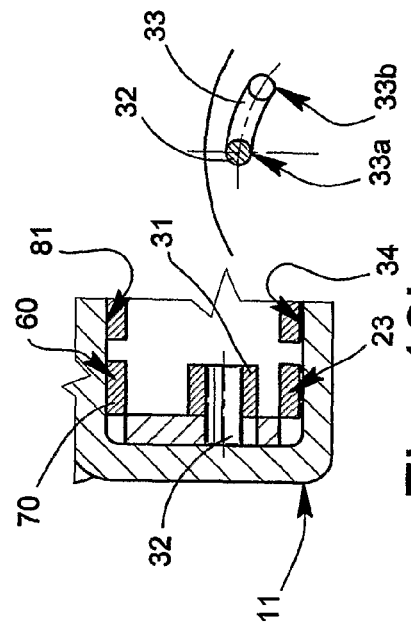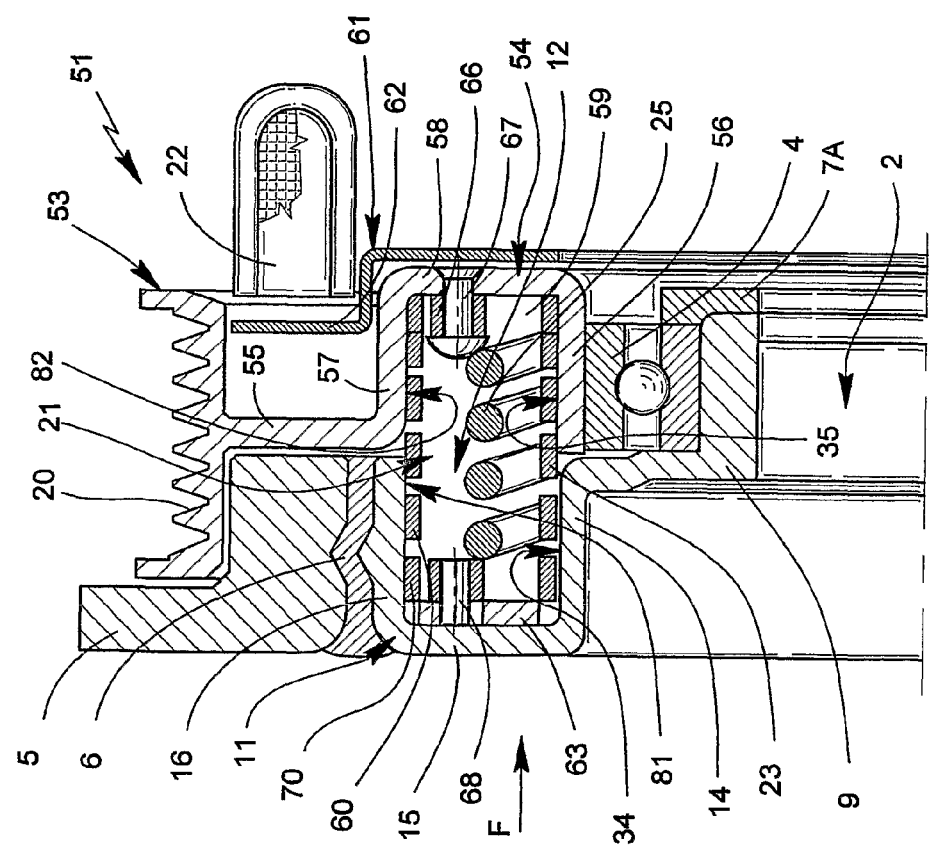

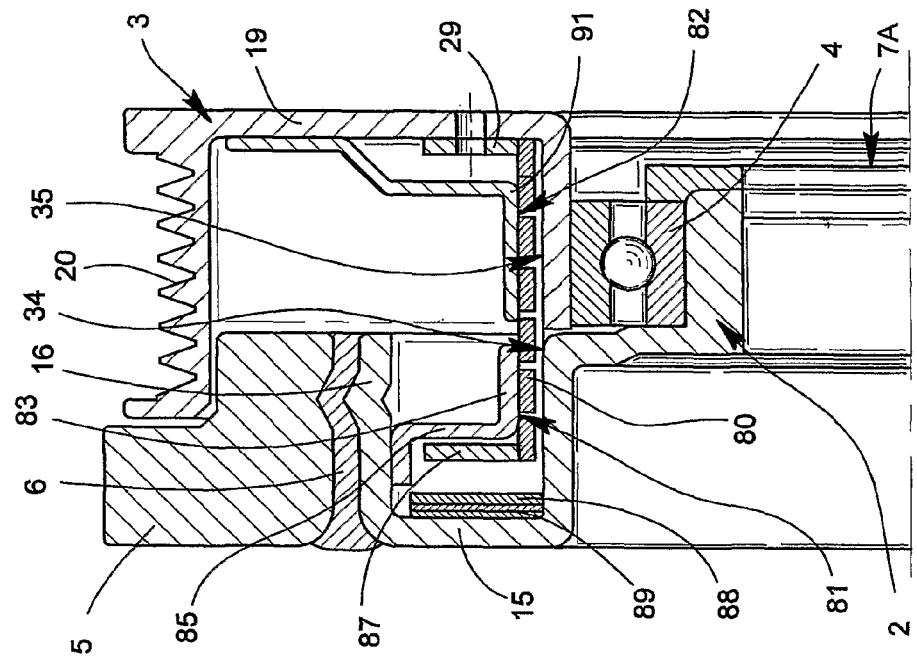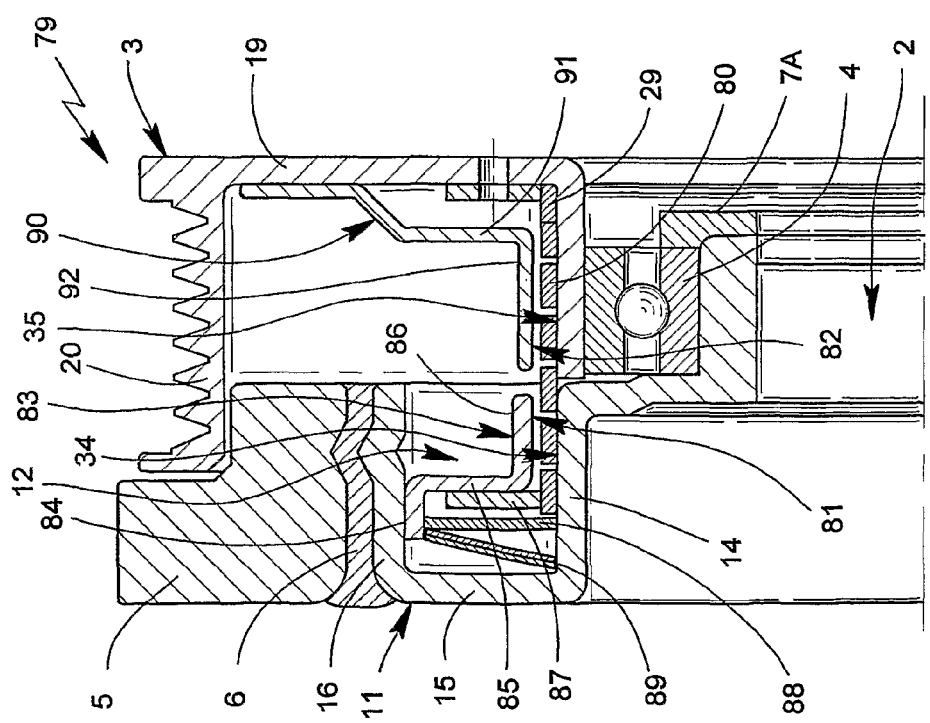

PULLEY ASSEMBLY FOR A START-STOP BELT DRIVE

This application is a 371 of PCT/IT2006/000173 filed on Mar. 21, 2006, published on Sep. 27, 2007 under publication number WO 2007/108020 A.

TECHNICAL FIELD

The present invention relates to a pulley assembly for a start-stop belt drive preferably designed to be connected to a crankshaft of an internal-combustion engine of a motor vehicle.

BACKGROUND ART

Pulley assemblies connected to the crankshaft are generally provided with a damping device and enable simultaneously driving of a belt drive for accessories and damping of the torsional vibrations of the crankshaft.

In order to reduce the levels of consumption, internal-combustion engines adopt a control system referred to as start-stop, whereby an electronic control unit turns off the engine when the vehicle is stationary and re-starts the engine when the accelerator pedal is pressed.

When the internal-combustion engine is turned on, the crankshaft drives the accessories belt drive, whilst, when the engine is turned off, for example when queuing at traffic lights, the accessories belt drive is driven by a further driving machine, for example a reversible electric machine connected to the belt drive and functioning either as alternator or as electric motor in response to a control signal of the electronic control unit.

Pulley assemblies are known provided with a hub, designed to be connected to a crankshaft of an internal-combustion engine, a seismic mass connected to the hub by an element made of elastomeric material so as to define a device for damping the torsional vibrations, and a pulley, rotatably mounted on the hub via a bearing. Known pulley assemblies further comprise an armature connected in an angularly fixed and axially mobile way to the hub and actuated via an electromagnet controlled by the electronic control unit.

In use, the armature is pressed axially against a wall of the pulley via an elastic element and, consequently, provides a friction connection that is angularly fixed between the hub and the pulley.

When the internal-combustion engine is turned off, the electronic control unit energises the electromagnet, and the mobile armature recedes against the action of the spring. Consequently, the pulley is de-coupled from the hub, and the belt drive can be actuated by the electric machine whilst the crankshaft remains angularly fixed.

The ever increasing value of the torque absorbed by the accessories calls for values of axial thrust which can be obtained only using springs of increasingly larger dimensions. Said springs moreover require a high current consumption by the electromagnet, and consequently part of the advantages of the start-stop system are nullified.

DISCLOSURE OF INVENTION

The aim of the present invention is to provide a pulley assembly for a start-stop belt drive that will be free from the drawbacks referred to above.

The aim of the present invention is achieved via a pulley assembly for a start-stop belt drive according to the following description.

BRIEF DESCRIPTION OF THE DRAWINGS

For a better understanding of the present invention some preferred embodiments are now described, purely by way of non-limiting example, with reference to the attached drawings, wherein:

FIGS. 1 and 3 are respective axial cross sections of a pulley assembly according to the present invention in two respective conditions of operation;

FIGS. 2 and 4 illustrate an enlarged detail of the pulley assembly of FIGS. 1 and 3 according to the view indicated by arrow F;

FIGS. 5, 7 and 9 are respective axial cross sections of a second embodiment of the present invention in three respective conditions of operation;

FIGS. 6, 8 and 10 illustrate enlarged details of the pulley assembly of FIGS. 5, 7, and 9 according to the view indicated by arrow F; and FIGS. 11 and 12 are respective axial cross sections of a third embodiment of the present invention in two respective conditions of operation.

BEST MODE FOR CARRYING OUT THE INVENTION

Figure 1:
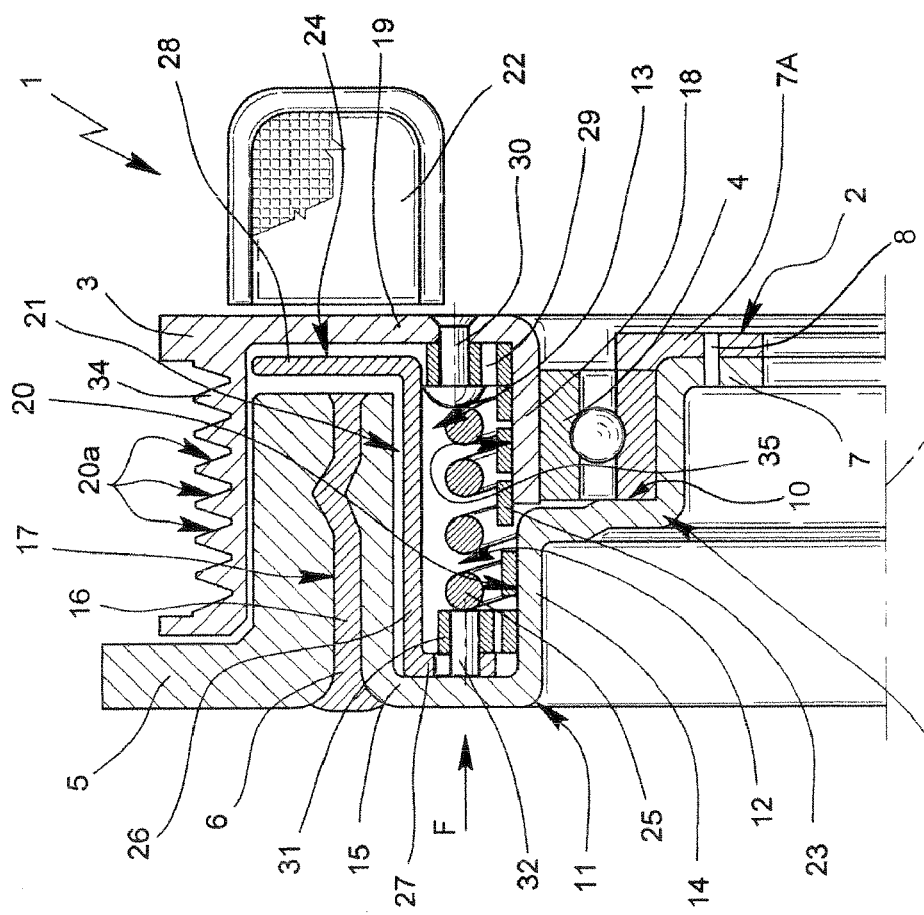

Designated by the reference number 1 in FIG. 1 is a pulley assembly comprising a hub 2, which has an axis A and is designed to be connected to a crankshaft of an internal-combustion engine, a pulley 3, connected to the hub 2 via a bearing 4, and a seismic ring 5, connected to the hub 2 via a band 6 made of elastomeric material so as to define a dynamic damper of torsional vibrations.

In particular, the hub 2 is made of a single body of metal plate and has, at respectively increasing concentric diameters, a flange 7, defining holes 8 for connection to the crankshaft, a supporting portion 9, having an L-shaped longitudinal section coming axially out from the flange 7 and defining a seat 10 for the bearing 4, and a C-shaped portion 11, coming axially out from the supporting portion 9. The bearing 4 is axially closed in the seat 10 via an annular plate 7a connected to the flange 7.

The C-shaped portion 11 defines a cavity 12 having an axial opening 13 facing the seat 10 and has a cylindrical wall 14, coming axially out from the supporting portion 9, a side wall 15, transverse to the axis A for closing the cavity 12 on the opposite side of the opening 13, and a cylindrical wall 16, radially external to the cylindrical wall 14 and axially extending up to the flange 7.

In addition, the cylindrical wall 16 supports the band 6 on a face 17 thereof that is radially external with respect to the cavity 12 and has the same axial dimensions as the band 6 and the seismic ring 5.

In order to reduce the axial dimensions, the pulley 3 is ring-shaped with a substantially C-shaped cross section for housing the dynamic damper at least partially.

In particular, the pulley 3 comprises a tubular wall 18, mounted on the outer ring of the bearing 4, a side wall 19, which is transverse to the axis A and faces axially the opening 13, and a crown wheel 20, which surrounds at least one axial portion of the seismic ring 5 and defines a plurality of grooves 20a designed to co-operate with a belt of a drive (not illustrated).

The pulley assembly 1 further comprises a band clutch 21, which co-operates between the hub 2 and the pulley 3 within the cavity 12 and is governed by an electromagnet 22 fixedly connected to a wall of the internal-combustion engine facing in use the pulley assembly 1.

In particular, the band clutch 21 comprises a coil element 23, wound on both the cylindrical wall 14 and the tubular wall 18, an electromagnetic armature 24, which co-operates with the coil element 23 and is axially mobile under the action of the electromagnet 22, and a helical spring 25, which surrounds the coil element 23 and is set so as to exert an axial load on the armature 24. C-B5

The armature 24 has a tubular portion 26 housed in the cavity 12 and a flange 28 coming out radially from the tubular portion 26 and axially set between the seismic ring 5 and the side wall 19.

In particular, the tubular portion 26 comprises an end wall 27, which is axially opposite to the flange 28 and is set between the coil element 23 and the side wall 15. The end wall 27 co-operates directly with the helical spring 25 and is pushed by the latter against the side wall 15.

The coil element 23 comprises an end portion 29, rigidly constrained to the side wall 19 via a pin 30, and an end portion 31, which is axially opposite to the end portion 29 and is connected to the end wall 27 of the armature 24.

In particular, the end portion 31 carries an axial pin 32, which is slidably housed in a groove 33 defined by the end wall 27. The groove 33 defines a path with respect to the axis A having a radial height decreasing as the angular position increases, where the angular position is considered as increasing when it has same direction of winding of the coil element 23 viewed from the direction indicated by the arrow F in FIG. 1.

In addition, the coil element 23 has a plurality of turns with a flattened rectangular cross section, which wind on cylindrical surfaces 34, 35, defined, respectively, by the cylindrical wall 14 and by the tubular wall 18. Preferably, the cylindrical surface 34 and the cylindrical surface 35 have the same diameter.

FIGS. 5 to 10 illustrate cross sections of a second embodiment of the present invention, in which elements that correspond or are functionally identical to the ones already used in the description of the pulley assembly 1 are designated by the same reference numbers.

Figure 5:
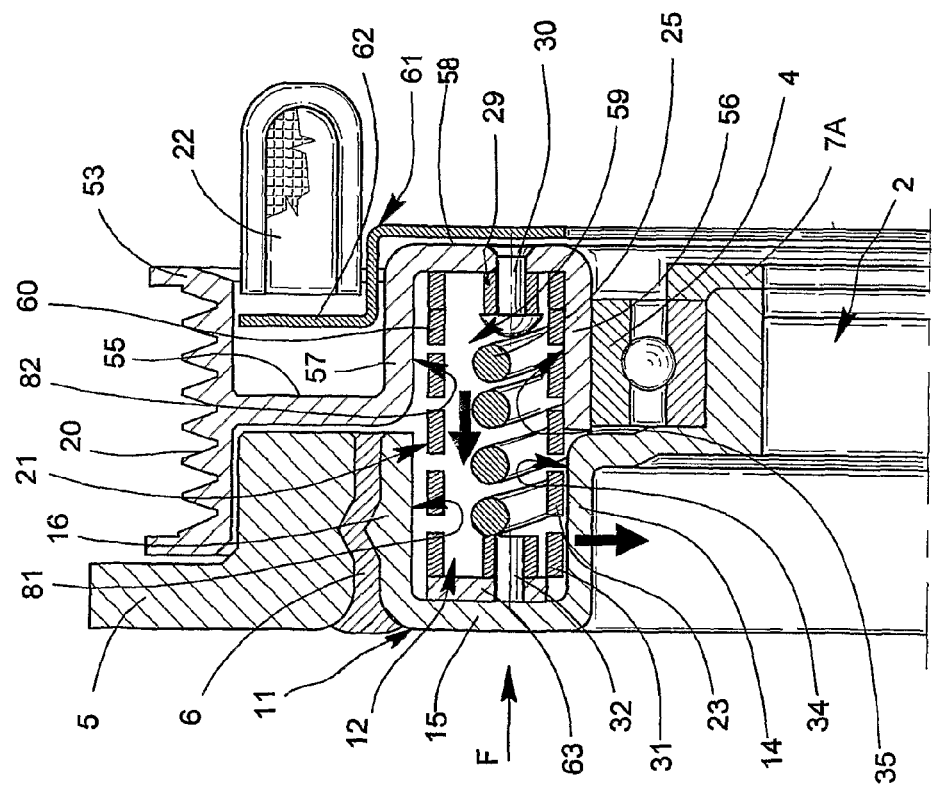
Figure 8A:
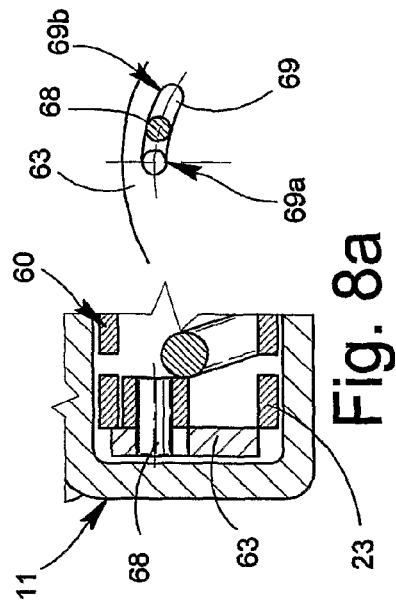
Figure 8B:
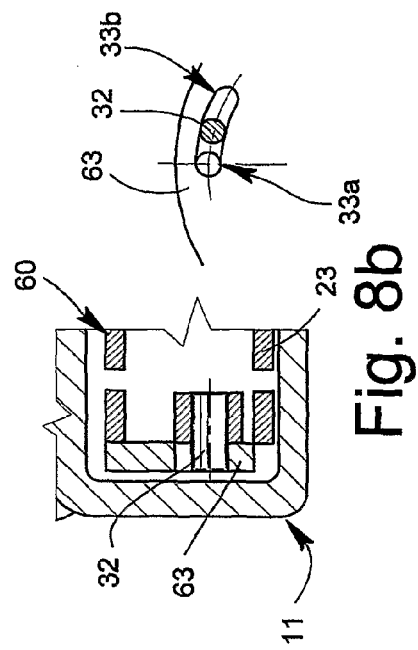
Figure 7:
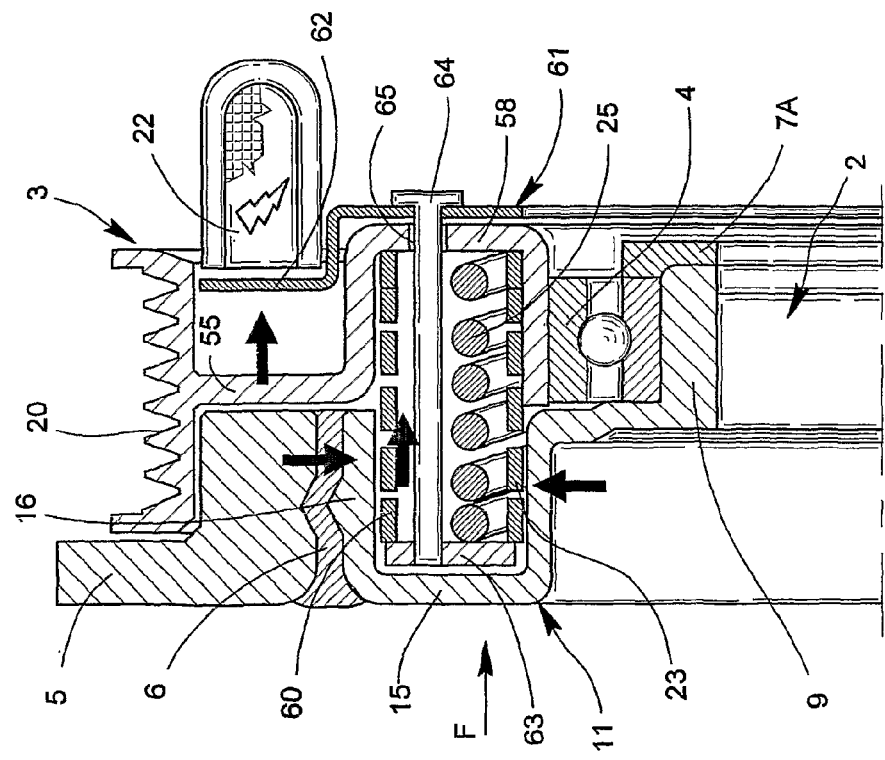

The pulley assembly of FIG. 5, designated by 51, has a hub 2, defining the supporting portion 9 for housing the bearing 4, and the C-shaped portion 11, defining the cavity 12 via the cylindrical wall 14, the side wall 15, and the cylindrical wall 16. The cylindrical wall 16 supports the elastomeric band 6 and the seismic ring 5. In the pulley assembly 51, however, the cylindrical walls 14, 16 have the same length.

The pulley assembly 51 further comprises: a pulley 53, which has a C-shaped annular portion 54, connected to the bearing 4; and a supporting wall 55, which comes radially out from the annular portion 54 on the opposite side of the bearing 4 and is connected to the crown wheel 20 in a position corresponding to the median plane of the latter.

In particular, the annular portion 54 comprises two tubular walls 56 and 57 connected to one another via a side wall 58 so as to define a cavity 59 having the same mean diameter as that of the cavity 12 and facing the latter.

The band clutch 21 is housed within cavities 12 and 59 and comprises the coil element 23, a coil element 60, which surrounds the coil element 23 and co-operates with cylindrical surfaces 81, 82 respectively defined by the cylindrical wall 16 and the tubular wall 57, and an electromagnetic armature assembly 61 kept in a predetermined position by the helical spring 25.

In particular, the electromagnetic armature assembly 61 comprises a flanged element 62, which is made of ferromagnetic metal plate and slides axially on an outer surface of the tubular wall 57, and a ring 63, which is housed within the cavity 12 and is pressed against the side wall 19 via the helical spring 25. The flanged element 62 and the seismic ring are partially surrounded by the crown wheel 20 and are located on respective axially opposite sides of the supporting wall 55. The electromagnetic armature assembly 61 further comprises a plurality of beam-like elements 64 (FIG. 7), which slide within respective holes 65 defined on the side wall 58 and arranged so as to connect rigidly, in an axial direction, the ring 63 to the flanged element 62.

In addition, the coil elements 23, 60 have respective turns with identical cross sections and respective end portions 29, 66 rigidly connected to the side wall 58 via respective pins 30 and 67 (FIGS. 5 and 9).

Figure 6A:
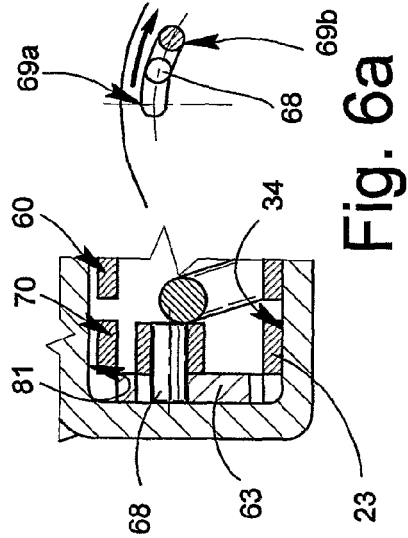

The coil element 23 is connected to the ring 63 via the axial pin 32, which is able to slide within the groove 33 (FIG. 6b), and the coil element 60 is likewise connected to the ring 63 via an axial pin 68, which slides within a groove 69 and is carried by an end portion 70 of the coil element 60 opposite to the end portion 66 (FIG. 6a).

In particular, the coil element 60 has the same direction of winding as that of the coil element 23, and the groove 69 has a radial height that decreases as the angular position increases, where the angular position is considered to increase when it has the same direction of winding as the coil element 60.

Preferably, the grooves 33, 69 are arranged on the ring 63 in different angular positions, for example spaced by 180° to enable a greater compactness in the radial direction and balancing when rotating.

FIG. 11 illustrates moreover a pulley assembly 79 according to a third embodiment, in which the band clutch 21 comprises a single coil element 80, which co-operates alternatively with the cylindrical surfaces 34, 35 and the cylindrical surfaces 81, 82, as will be specified more fully in what follows.

The elements of the pulley assembly 79 that functionally correspond to those of the pulley assemblies 1 and 51 are designated in what follows by the same reference numbers already used above.

In particular, the pulley assembly 79 comprises the pulley 3 having a C-shaped cross section mounted on the hub 2 via the bearing 4. The hub 2 has the C-shaped portion 11, in which the cylindrical walls 14 and 16 have substantially the same length.

Within the cavity 12 defined by the C-shaped portion 11, the hub 2 comprises a flange element 83 having an annular wall 84, rigidly connected to the cylindrical wall 16, a transverse wall 85, extending radially towards the centre of the annular wall 84, and a tubular portion 86, coming axially out from the transverse wall 85 on the opposite side of the annular wall 84 with respect to the transverse wall 85.

The tubular portion 86 is concentric to the cylindrical wall 14 and defines with the latter an annular compartment, which is delimited at the top by the cylindrical surface 81 and houses an axial portion of the coil element 80. The coil element 80 has a flanged end portion 87 axially set between the side wall 15 and the transverse wall 85.

The pulley assembly 79 further comprises an annular armature 88, which co-operates with the flanged end portion 87, and a Belleville washer 89, which rests against the side wall 15 and co-operates with the annular armature 88 so as to press the flanged end portion 87 against the transverse wall 85.

On the axially opposite side of the flanged end portion 87, the coil element 80 presents the end portion 29 rigidly connected to the side wall 19. UIn addition, the pulley 3 comprises a funnel-shaped element 90, which integrally has a flange 91 rigidly connected to the side wall 19, and a tubular portion 92, which comes out from the flange 91 and defines the cylindrical surface 82. In particular, the tubular portion 92 is concentric to the side wall 19 and defines an annular compartment for housing the remaining axial portion of the coil element 80.

Operation of the pulley assembly 1 is described in what follows.

Figure 2:
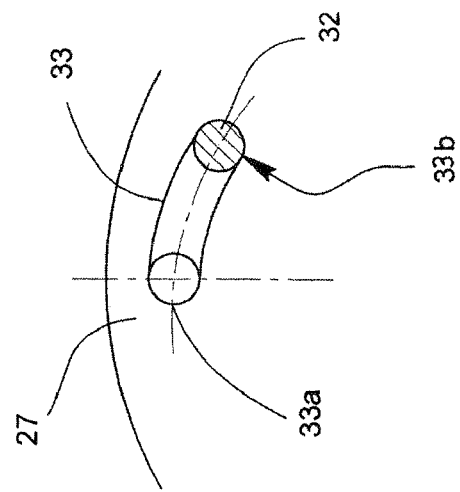

During operation of the internal-combustion engine, the belt drive for accessories is driven via the crankshaft, and the band clutch is closed in such a way that the hub 2 and the pulley 3 are rotationally fixed to one another. The axial pin 32 is located so that it bears upon an end-of-travel 33b defined by the groove 33 (FIG. 2), and the armature 24 is kept fixed to the hub 2 by friction against the side wall 15 via the action of the helical spring 25. In this way, both of the axial end portions 31, 29 are rotationally fixed to the respective hub 2 and pulley 3. In addition, the coil element 23 has a direction of winding of the coil such that, in the condition of operation where the hub 2 tends to overrun the pulley 3, the turns tend to tighten and grip on the cylindrical surfaces 34, 35 so as to render the hub 2 and pulley 3 rotationally fixed to one another.

When the vehicle is stationary, for example waiting at the traffic lights, the electronic control unit turns off the engine, and the transmission is driven by the reversible electric machine. Accordingly, the electronic control unit energises the electromagnet 22, which decouples the armature 24 from the hub 2 against the action of the helical spring 25 (FIG. 3) and enables the pulley 3 to rotate idle guided by the bearing 4.

Following upon the movement of recession of the armature 24, the coil element 23 tends to unwind sufficiently to cause a radial expansion of the turns and decouples from the cylindrical surface 34 so as to enable free rotation of the pulley 3 with respect to the hub 2. It is possible to exploit the elastic return of the coil element 23 in order to favour its unwinding by appropriately sizing the geometry of the groove 33. In fact, after decoupling of the armature 24 from the hub 2, the end portion 31 of the coil element 23 tends to unwind and moves in the direction of the arrest 33a (FIG. 4). The groove 33 has a variable radial height and consequently guides the radial movement of the end portion 31 and facilitates decoupling.

When the accelerator pedal is pressed, the electronic control unit starts the engine via the starting motor connected to the fly-wheel of the crankshaft. Following upon starting of the engine, the electronic control unit interrupts energization of the electromagnet 22 when the tangential velocity of the hub 2 and of the pulley 3 are equal. Consequently, the armature ???23 [?24] is pushed against the hub 2 by the helical spring 25 and starts to rotate rigidly with the latter. The axial pin 32 slides along the groove 33 towards the end-of-travel 33b (FIG. 2), and the axial end portion 31 approaches the cylindrical surface 34. When the axial end portion 34 comes into contact with the cylindrical surface 34 or else with the end-of-travel 33b, it becomes rotationally fixed to the hub 2 and tends to wind up the coil element 23 on the cylindrical surfaces 34, 35. The band clutch 21 closes, and the hub 2 draws the belt drive for accessories. At the same time, the electronic control unit switches operation of the reversible electric machine into the alternator mode.

The pulley assembly 51 is used on engines in which the reversible electric machine also performs the function of starting motor.

Figure 6B:
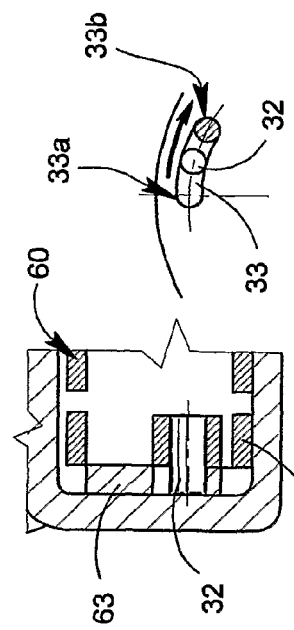

In particular, when the engine drives the belt drive, the coil element 23 functions as described previously. In addition, the coil element 60 is simultaneously decoupled from the cylindrical surfaces 81, 82. This is due to the fact that the directions of rotation of the coil are the same as one another and to the fact that the radial heights of both of the grooves 33, 69 with respect to the axis A decrease in the same reference system of polar co-ordinates (FIGS. 6a, 6b).

When the belt drive for accessories is driven by the reversible electric machine, the armature assembly 61 recedes towards the pulley 53 and compresses both of the coil elements 23, 60, and the coil element 23 is decoupled as described previously (FIG. 7).

At the same time, since compression of the coil elements 23, 60 causes their unwinding and consequently their radial expansion, the coil element 60 tends to approach the cylindrical surface 81, which is an internal cylindrical surface that surrounds the coil element 60. Furthermore, the geometry of the grooves 33, 69 guides the radial displacement during unwinding of the coil elements 23, 60.

When the accelerator pedal is pressed, the reversible electric machine slows down until it stops, the electronic control unit issues a command for interruption of the current to the electromagnet 22, and the helical spring 25 brings the armature assembly 61 to bear upon the hub 2 (FIG. 9).

Consequently, the armature assembly 61 is rotationally fixed to the hub 2 and, in this case, the driving torque is applied to the pulley 53 in order to start the crankshaft via the hub 2.

In this condition, the speed of the pulley 53 tends to exceed that of the hub 2, and this causes an unwinding of both of the coil elements 23, 60 when the axial end portions 31, 66 bear upon the respective ends-of-travel 33a and 69a (FIGS. 10a, 10b). In particular, the coil element 23 moves away from the cylindrical surfaces 34, 35 around which it is wound whilst the coil element 60 couples by friction against the cylindrical surfaces 81, 82 that surround it.

Consequently, the pulley 53 is rotationally fixed to the hub 2, and the crankshaft is driven in rotation. Coupling is moreover favoured by the geometry of the groove 69, which, in the case of unwinding of the coil element 60, tends to approach the end portion 66 towards the cylindrical surface 81.

When the engine is started, the engine torque increases until it exceeds that of the reversible electric machine.

In this case, as has already been described, the hub 2 tends to overtake the pulley 53. Consequently, the coil elements 23, 60 tend to wind up, and the coil element 23 couples again with the cylindrical surfaces 34, 35 so as to render the pulley 53 rotationally fixed to the hub 2 (FIG. 5).

Simultaneously, also the coil element 60 winds up and consequently decouples from the cylindrical surfaces 81, 82 when the pin 67 carried by the end portion 66 bears upon the end-of-travel 69b.

The pulley assembly 79 functions in a way similar to the pulley assembly 51 but uses a single coil element 80. In particular, when the engine drives the belt drive, the coil element 80 is coupled to the cylindrical surfaces 34, 35 in a way similar to the coil element 23.

When the belt drive is driven via the reversible electric machine, the annular armature 88 recedes under the action of the electromagnet 22, and the flanged end portion 87 separates itself from the transverse wall 85. Consequently, the coil element 80 re-establish its own undeformed configuration and decouples from the cylindrical surface 34.

When the engine is started via the reversible electric machine, the electromagnet 22 is disabled, and the Belleville washer 89 pushes both the annular armature 88 and the flanged end portion 87 against the transverse wall 85. In this way, the flanged end portion 87 is rotationally fixed to the hub 2. Consequently, when the driving torque comes from the belt drive and the pulley 3 tends to overtake the hub 2, the coil element 80 winds up and couples by friction against the cylindrical surfaces 81, 82.

After the engine is started and the reversible electric machine is switched into the alternator mode, the driving torque comes from the crankshaft, and the hub 2 tends to overtake the pulley 3.

Consequently, the elastic element tends to wind up and decouples from the cylindrical surfaces 81, 82 so as to grip around the cylindrical surfaces 34, 35 and render the hub 2 rotationally fixed to the pulley 3.

The advantages that the pulley assemblies 1, 51, 79 described above enable are outlined in what follows.

The use of a band clutch enables transmission of high torques with reduced radial dimensions and without the use of axial springs of large dimensions.

In addition, via appropriate sizing of the times of coupling of the band clutch 21, it is possible to obtain a damping of the high vibrations during the first instants of starting of the internal-combustion engine and/or provide rotational coupling of the crankshaft only after the starting transient of the engine.

Use of a band clutch has moreover proven adequate to enable correct operation of the dynamic damper integrated on the hub 2.

The grooves 33, 69 favour coupling and decoupling and reduce both the response times and the risks of jamming by adhesion of the coil elements 23, 60, 80 against the surfaces 34, 35, 81, 82.

The helical spring 25 and the Belleville washer 89 exert smaller axial forces and are consequently of contained dimensions. For the same reason, the current necessary for countering their action is reduced.

Finally, it is clear that modifications and variations may be made to the hub-pulley assemblies described and illustrated herein, without thereby departing from the sphere of protection of the present invention, as defined in the annexed claims.

The pulley assemblies 1 and 51 can have end portions 31 having a flange similar to the end portion 87. Likewise, the annular armature 88 can have a groove similar to the groove 33, and the end portion 87 can carry an axial pin coupling with the groove.

Furthermore, it may be envisaged that the coil elements 23, 60, 80 are constrained differently from the way described above. In fact, it is possible to obtain the same operation by rigidly constraining the end portions 29, 70 to the hub 2 and modifying the armatures 23, 61, 88 accordingly.

It is possible to modify the direction of rotation of the coil elements 23 and 60 and the geometry of the grooves 33, 69 with respect to the hub-pulley assembly 51 so as to obtain that the coil element 60 will be coupled with the cylindrical surfaces 81, 82 when the hub 2 tends to overtake the pulley 53 and, vice versa, will be coupled to the cylindrical surfaces 34, 35 when the pulley 53 tends to overtake the hub 2.

Also the pulley assemblies 1 and 79 can be modified in this sense.

In addition, the axial action exerted by the helical spring 25 and by the Belleville washer 89 can be obtained via an appropriate axial preloading of the coil elements 23, 60, 80.

The invention claimed is:

1. A pulley assembly for a start-stop belt drive, comprising a hub having an axis and designed to be connected to a crankshaft of an internal-combustion engine, a pulley designed to co-operate with a belt of a belt drive and supported in a rotatable way by said hub through a bearing, and a seismic mass connected to said hub so as to rotate with respect to said hub for defining a dynamic damping device for damping the torsional vibrations, said pulley assembly comprises a band clutch, which co-operates selectively between said hub and said pulley, the band clutch comprising a coil element and electromagnetic actuation means co-operating with said coil element and mobile between a coupling position in which said band clutch is closed and said hub is rotationally fixed to said pulley when said hub tends to overtake said pulley, and a position of decoupling in which said band clutch is open and said pulley turns idle on said hub and in that said band clutch is at least partially housed in a cavity defined by said hub in a position radially lower than that of said seismic mass.

2. The pulley assembly according to claim 1, wherein said coil element-comprises a first axial end portion permanently constrained to one between said hub and said pulley, and a second axial end portion, opposite to said first axial end portion, cooperating with said electromagnetic actuation means.

3. The pulley assembly according to claim 2, wherein it comprises guide means, which are set between said second axial end portion and said electromagnetic actuation means and are configured so as to vary the radial position of said axial end portion in response to a relative rotation between said second end portion and said electromagnetic actuation means for closing said band clutch.

4. The pulley assembly according to claim 3, wherein said guide means define a groove carried by said electromagnetic actuation means, and a pin carried by said second axial end portion and slidably housed in said groove.

5. The pulley assembly according to claim 2, wherein said first axial end portion is constrained to said pulley and in that said hub and said pulley define a first cylindrical surface and a second cylindrical surface, respectively, which share said axis and co-operate selectively with said coil element.

6. The pulley assembly according to claim 5, wherein said first and second cylindrical surfaces are surrounded by said coil element.

7. The pulley assembly according to claim 2, wherein at least one between said hub and said pulley defines a first coupling surface and a second coupling surface set at a radial distance from one another and in that said coil element is radially set between said first coupling surface and said second coupling surface and co-operates selectively with said first and second coupling surfaces in said coupling position.

8. The pulley assembly according to claim 7, wherein said second axial end portion is flanged and cooperates by friction against a transverse wall of one between said hub and said pulley in said coupling position.

9. The pulley assembly according to claim 8, wherein said electromagnetic actuation means comprise an annular armature co-operating axially with said second axial end portion.

10. The pulley assembly according to claim 1, wherein said electromagnetic actuation means are axially set between said hub and said pulley.

11. The pulley assembly according to claim 1, wherein said band clutch comprises a second coil element co-operating with said electromagnetic coupling means for rendering said hub rotationally fixed to said pulley in response to a relative rotation between said hub and said pulley in a second predetermined direction opposite to said predetermined direction.

12. The pulley assembly according to claim 11, wherein said second coil element comprises a third axial end portion permanently constrained to one between said hub and said pulley, and a fourth axial end portion opposite to said third axial end portion and co-operating with said electromagnetic actuation means.

13. The pulley assembly according to claim 12, wherein it comprises guide means set between said fourth axial end portion and said electromagnetic actuation means and configured so as to vary the radial position of said axial end portion in response to a relative rotation between said fourth axial end portion and said electromagnetic actuation means for closing said band clutch.

14. The pulley assembly according to claim 13, wherein said guide means define a second groove carried by said electromagnetic actuation means, and a second pin carried by said fourth end portion and slidably housed in said second groove.

15. The pulley assembly according to claim 12, wherein said third axial end portion is constrained to said pulley and in that said hub and said pulley define, respectively, a third cylindrical surface and a fourth cylindrical surface, which are, respectively, concentric to said first and second cylindrical surfaces and surround said second coil element.

16. The pulley assembly according to claim 15, wherein said electromagnetic actuation means comprise an armature slidably supported by said pulley.

17. The pulley assembly according to claim 16, wherein said pulley is axially set between said armature and said hub and in that said electromagnetic actuation means comprise a supporting element axially set between said hub and said pulley, and a plurality of beam-like elements, which are connected in an axially rigid way between said armature and said supporting element and slide in respective holes defined by said hub.

18. The pulley assembly according to claim 1, wherein the pulley assembly comprises elastic means co-operating axially with said electromagnetic actuation means for maintaining said coupling position.

19. The pulley assembly according to claim 1, wherein said electromagnetic actuation means are maintained in said coupling position via a thrust exerted axially by said coil element.

20. The pulley assembly according to claim 1 wherein said cavity is axially closed by said pulley.

* * * * *